May 6, 1969  A. J. FAUSTINI  3,442,285
VALVING MECHANISM HAVING CONTINUOUSLY FLUSHED LIQUID SEAL
Filed May 18, 1966
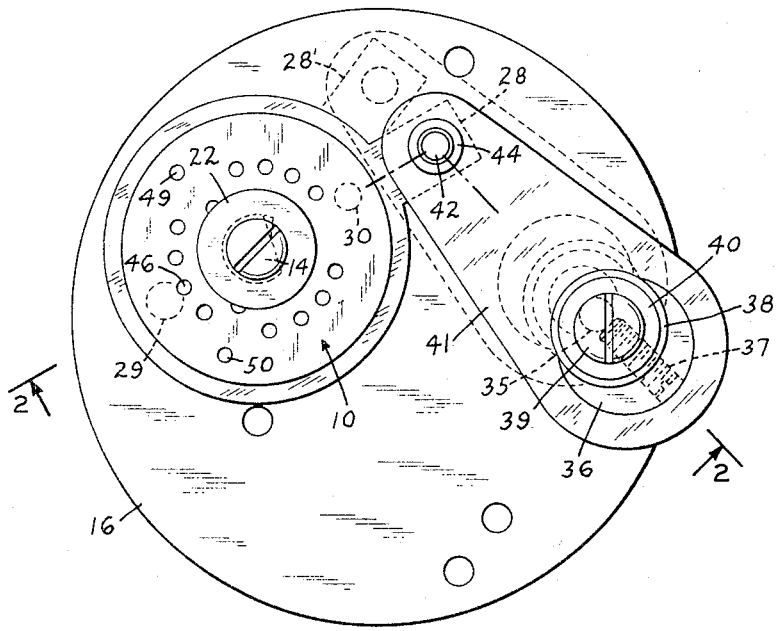
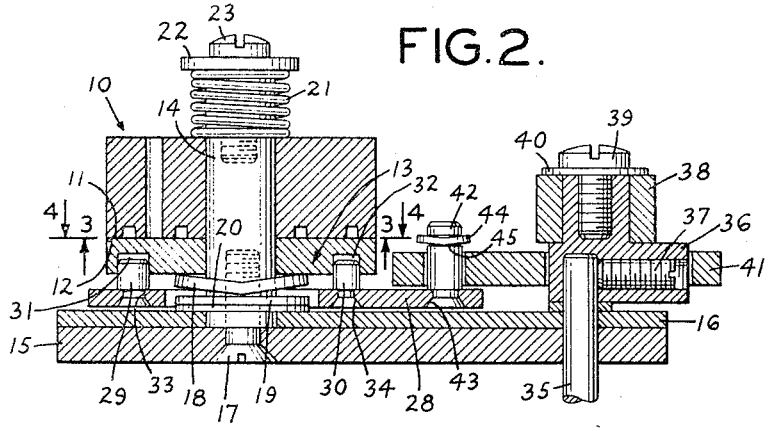
INVENTOR
ALBERT J. FAUSTINI
BY
ATTORNEY

INVENTOR
ALBERT J. FAUSTINI
BY
ATTORNEY

United States Patent Office 3,442,285
Patented May 6, 1969

3,442,285
VALVING MECHANISM HAVING CONTINUOUSLY FLUSHED LIQUID SEAL
Albert J. Faustini, Oakland, Calif., assignor, by mesne assignments, to American Optical Corporation, Southbridge, Mass., a corporation of Delaware
Filed May 18, 1966, Ser. No. 551,019
Int. Cl. *51/00*
U.S. Cl. 137—240          2 Claims

ABSTRACT OF THE DISCLOSURE

Easily assembled and disassembled multiport fluid handling face plate mechanism for controlling the flow of fluids passing therethrough and so constructed and arranged as to seal said structure and maintain such a sealed condition over extended periods of use.

---

The present invention relates to an improved multiport fluid handling face value structure capable of handling corrosive liquids as well as concentrated salt solutions yet able to maintain a tight seal after continuous operation for extended periods of time.

It is an object of this invention to provide an efficient multiport fluid handling face valve means adapted to be rotated rapidly from one porting position to another.

Another object of this invention is the provision of a self-sealed face valve mechanism which is self-seating in operation.

Yet another object of this invention is to provide a self-sealed face valve mechanism suitable for use with corrosive liquids as well as with aqueous solutions in which the solute is highly concentrated and in which leakage due to failure of the face seal by reason of solute deposition is minimized.

A further object of this invention is to provide a face valve mechanism which may be easily assembled and disassembled for modification of valve operation by replacement or substitution of parts.

Other objects will appear hereinafter from the following detailed description and the accompanying drawings in which:

FIG. 1 is a plan view of the face valve mechanism of this invention showing the base plate upon which the valve elements are mounted as well as the cam and link means employed for rotating the lower of the two face valve elements to shift the valve elements from one porting position to the other;

FIG. 2 is a side elevational view in section of said face valve elements taken along the intersecting lines 2—2 in FIG. 1 showing the manner in which the elements of the face valve are assembled on a central axial shaft and the manner in which the cam and link means cooperate in effecting this rotating movement;

Figure 5:
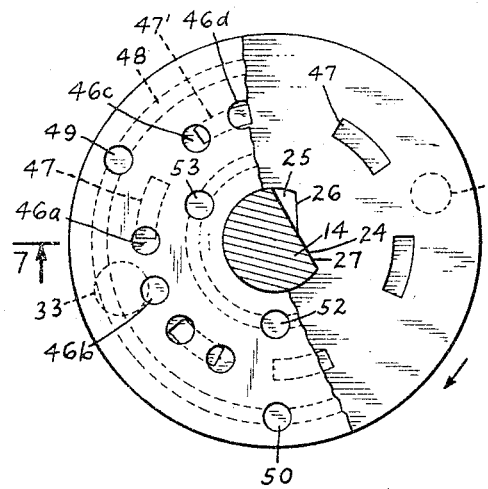
FIG. 5 is a plan view of the assembled face plates in superimposed operative position showing a part of the upper face plate broken away, the upper and lower face plates being shown in that operative position relative to each other in which the movable lower face plate is rotated to its furthest clockwise position.
Figure 6:
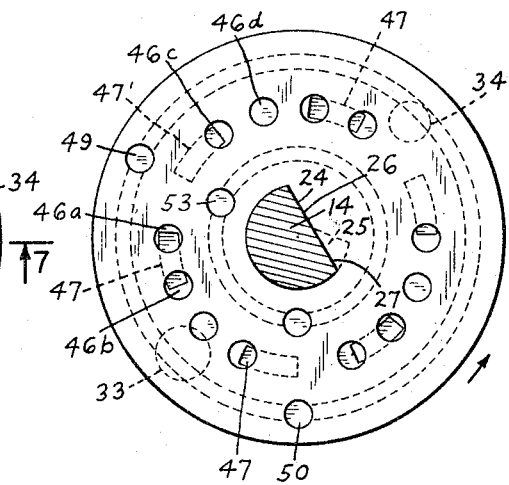
Figure 7:
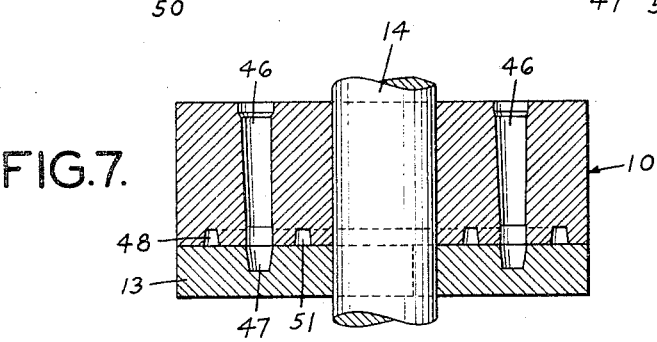

FIG. 6 is a plan view of the fixed upper and movable lower face plates in that superimposed operative position relative to each other where the movable lower face plate is rotated to its furthest counterclockwise or alternate porting position; and, FIG. 7 is a side elevational view, in section, taken along line 7—7 of FIG. 5 of the assembled upper and lower face plates and showing the central axial shaft on which they are mounted.

Like reference numerals indicate like parts throughout the several views of the drawing.

Referring now to the drawing and more particularly to FIGS. 1 and 2 the preferred embodiment of the novel face valve structure of this invention comprises a fixed upper face plate 10 whose lower lapped surface 11 is normally in operative contact with the upper lapped surface 12 of a rotatably mounted lower face plate 13. The upper and lower face plates are so mounted on a centrally disposed axial shaft 14 that upper face plate 10 is held stationary relative to the shaft while lower face plate 13 is free to be pivoted in a limited radial arc about axial shaft 14. The manner in which lower face plate 13 is mounted for rotation on shaft 14 enables one to shift the registry of opposed faces 11 and 12 of said assembled face plates relative to each other. This movement causes the desired shift of the valve structure from one porting position to another.

As shown in FIG. 2 centrally disposed axial shaft 14 is attached firmly in fixed position to a supporting base plate 15, which also carries a guide plate 16 fixed thereto, base plate 15 being held in position by means of a flat headed machine screw 17 threaded into the base of shaft 14. As shown in the assembled parts in FIG. 2, lower face plate 13 is seated on a pivot washer 18 having a slight bend at the center line which together with its upper outer edges functions as a gimbal bearing and which rides on the surface of a second flat washer 19 which in turn is seated on a plastic "Teflon" washer 20. Each of said washers is mounted in superimposed position on shaft 14 as shown.

In order to maintain the desired pressure between the opposed operative faces 11 and 12 of upper face plate 10 and lower face plate 13 when all of the valve elements are in assembled position, the several parts are urged toward each other by the pressure exerted by a helical spring 21. Helical spring 21 which circles shaft 14 is held in compression between a washer 22 and the top of upper face plate 10 through the action of a machine screw 23 threaded into the top of shaft 14. The normal bias of coil spring 21 while held under compression exerts a constant downward pressure which urges upper face plate 10 downwardly against the top of lower face plate 13 thus maintaining a satisfactory seal between faces 11 and 12 without use of sealing rings.

Figure 3:
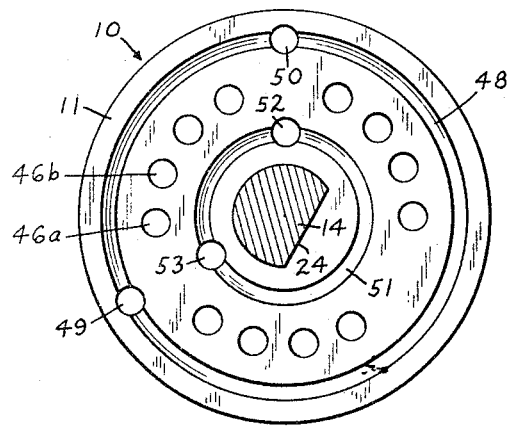
FIG. 3 is a view of the fixed upper face plate of the face valve mechanism taken from below and looking upward at its lower or operative surface, this view being in the direction of arrows 3—3 of FIG. 2.

The upper face plate 10 as indicated above is mounted on and in fixed position relative to axial shaft 14. Any rotary movement between upper face plate 10 and axial shaft 14 is prevented by providing a flat face 24 ground on one side of shaft 14 and by providing a complementary flat face in the opening shown in the center of plate 10 in FIG. 3.

Figure 4:
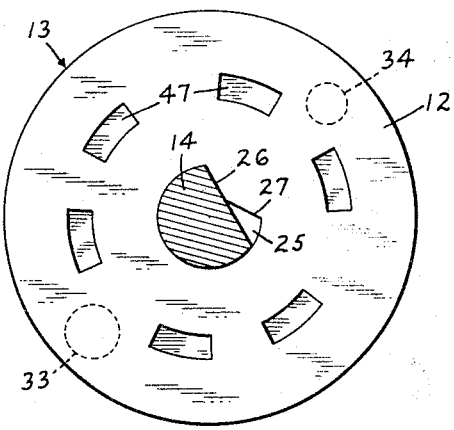
FIG. 4 is a plan view of the movable lower face plate of the face valve mechanism showing its upper operative surface and is taken in the direction of arrows 4—4 of FIG. 2.

Lower face plate 13 is also mounted on central shaft 14 but the shape of the opening 25 provided in the center of lower face plate 13 as shown in FIG. 4 is such as to allow some limited rotation of lower face plate 13 about axial shaft 14.

This is effected by providing center hole 25 with such a periphery, that on pivoting plate 13 to the furthest counterclockwise position as shown in FIG. 6 the edge 26 of center hole 25 moves toward and approaches flat face 24 of axial shaft 14. When lower face plate 13 is pivoted to the furthest clockwise position it can assume in relation to shaft 14, as shown in FIG. 5, the inner edge 27 of hole 25 moves toward flat face 24. Thus, the clockwise and counterclockwise limit of rotation for lower face plate 13 is determined by the configuration of center hole 25 as defined by the angle of intersection of edges 26 and 27 of center hole 25.

The axial rotation or pivotal movement of lower face plate 13 to shift the position of lower face plate 13 relative to fixed upper face plate 10 from one porting position to the other is effected by the rocking motion of lever 28 shown in FIG. 1. The lower face plate 13 is in fixed position relative to lever 28, being connected to lever 28 through pins 29 and 30 which register respectively with holes 31 and 32 in the lower surface of plate 13, the lower portions of pins 29 and 30 being riveted to lever 28 at holes 33 and 34 in said lever.

Lever 28 is rocked in clockwise direction to cause plate 13 to assume a first porting position as in FIG. 5 and then counterclockwise to assume a second porting position as shown in FIG. 6 by the rotation of drive shaft 35 which is intermittently rotated. The power provided to drive shaft 35 consists of an electric motor (not shown) which is controlled by a suitably wired remote selector switch (not shown) which on command of a positioning switch (not shown) causes the motor to drive shaft 35 whose rotation causes it to control the movement and position of lower face plate 13.

The movement of drive shaft 35 rotates a cam 36 which is eccentrically mounted on and fixed to shaft 35 by means of a set screw 37 as shown in FIG. 1. The upper cylindrical portion of cam 36 carries a cylindrical cam sleeve 38 which is held in position on cam 36 by means of machine screw 39 and a washer 40. Cam 36 rotates in a link 41 whose opposite end is pivotally connected through a pin 42 to lever 28. The bottom of pin 42 is riveted in hole 43 of lever 28 while link 41 is held in position on pin 42 by a retaining ring 44 which when pressed down over the chamfered top of pin 42 snaps into an annular peripheral groove 45 provided in the upper portion of pin 42.

In operation, the rotation of motor driven shaft 35 causes eccentric cam 36 to drive link 41 and cause it to reciprocate intermittently. The initial motion as shown in FIG. 1 is to rock lever 28 counterclockwise until it assumes the position 28'. This movement of lever 28 thereby causes the counterclockwise displacement of lower face plate 13 about fixed shaft 14 as shown in FIG. 6 so that opposing faces 11 and 12 then move from that first porting position which is shown in FIG. 5 to that second porting position which is shown in FIG. 6. When shaft 35 is again caused to rotate on signal, movement of cam 36 causes the opposite motion to take place and the valve faces are returned from the porting position shown in FIG. 6 to that shown in FIG. 5. These limits of movement in the relative positions of upper plate 10 and lower plate 13 caused by the appropriate selector and positioning switches (not shown) provide the desired porting position.

In operation cam 36, link 41, and lever 28 position movable lower plate 13 to its normal operating position which in actual practice is a degree or two of rotation short of the surfaces 26 and 27. The latter are ordinarily provided to facilitate assembly but if improperly oriented or of erroneous dimension will be so indicated immediately by causing a stalling of the motor drive.

As shown in FIGS. 3, 5, 6 and 7, upper face plate 10 is provided with a plurality of ports 46 which extend through the body of upper face plate 10 is shown in FIG. 7. Suitable tubing (not shown) through which any fluid stream such as air or a liquid can be passed is fitted into the upper end of each port 46. Thus, a fluid stream entering one port of the valve body can be directed as desired to another port by rotating lower face plate 13 which is provided with a plurality of channels 47 and which by this rotation cause the respective ports to communicate with each other.

Thus, for example, when lower face plate 13 is in the position shown in FIG. 5 relative to upper face plate 10, port 46$^a$ is not in communication with port 46$^b$ since channel 47 does not permit communication between both ports. However, it will be noted that in the porting position shown in FIG. 5 port 46$^c$ is in communication with port 46$^d$ through channel 47'.

When lever 28 is pivoted in a counterclockwise direction by the action of cam 36 on link 41 to position 28' in FIG. 1, the position of channel 47 is shifted to that shown in FIG. 6 thus allowing port 46$^a$ and 46$^b$ to communicate through channel 47 and permit any stream entering port 46$^a$ to flow out of port 46$^b$, and vice versa. It will also be noted that whereas ports 46$^c$ and 46$^d$ were previously in communication in FIG. 5 through channel 47', the counterclockwise rotation of face plate 13 to the position shown in FIG. 6 shifts channel 47' and cuts off communication between ports 46$^c$ and 46$^d$.

It is to be understood, of course, that the cooperation of parts to effect communication between ports 46$^a$ and 46$^b$ through channel 47 and between 46$^c$ and 46$^d$ through channel 47' applies equally with respect to the several other ports and channels which function in equivalent fashion. By suitable design in the location and number of ports 46 as well as channels 47 the face valve of this invention is able to provide a high degree of flexibility in directing a plurality of streams from one port to another or of cutting off the flow between adjacent ports, as the case may be.

Thus, while the pivoting of lower face plate 13 may cause a given channel 47 to connect a given port 46 with another port, the same movement of lower face plate 13 as described above may serve to shift the relative position of other ports and channels to give the desired flexibility of communication between the several ports.

One of the novel and important features of the present invention enables a tight seal to be maintained indefinitely between the operative faces of the face valve structure. This novel feature eliminates the necessity for providing sealing rings which normally require periodic replacement because of wear or chemical degradation. This novel feature which minimizes any harmful or undesirable effects of possible leakage from between the faces or from the several ports and channels resides in the provision of circumferential traps in the lapped lower face of plate 10 as more particularly shown in FIGS. 3 and 7. One of said traps is annular groove 48 located at the outer periphery of plate 10 and surrounding ports 6. Annular groove 48 is provided with an inlet port 49 and an outlet port 50 through which water or other liquid may be introduced and circulated through groove 48 thus providing a seal and also removing any material handled by the valve structure which due to possible leakage may reach groove 48. By removing any possible leakage before it can reach the valve face periphery no evaporation and solute deposit can take place at the outer edge of the valve assembly thus avoiding the formation and deposit of crystalline material which would tend to force the valve faces apart.

A second inner trap is also provided in the form of annular groove 51 which surrounds central axial shaft 14 and separates it from ports 46. Groove 51 is provided with an inlet port 52 and an outlet port 53. Water or any other desired solvent is circulated through annular groove 51 to provide an inner seal for removing any inner solute leakage to prevent the latter from reaching shaft 14 and to prevent the building up of crystal particles which on growing tend to force the face valve elements apart. By appropriate piping connections the water or other solvent being circulated through these annular grooves may first be passed through groove 48 and then through groove 51 or vice versa.

With continued use, the tightness of fit between the opposed valve faces 11 and 12 continues to improve. Although initially lapped to extreme flatness to eliminate or minimize any possible leakage, any high spots which may possibly remain are caused to decrease in height with use since their tendency is to wear down thus greatly improving the seal between the faces.

It is understood that the foregoing detailed description is given merely by way of illustration and that many variations may be made therein without departing from the spirit of my invention.

Having described my invention, what I desire to secure by Letters Patent is:

1. A face valve mechanism for controlling the flow of fluids therethrough, said face valve mechanism comprising a supporting base member, a shaft carried by said supporting base member in fixed relation thereto and extending outwardly from one side thereof, a flat surface formed upon a side portion of said shaft in such manner as to extend in parallel relation to the axis of said shaft from the free outer end thereof at least the greater part of the length of said shaft, an inner face plate having a central opening therein positioned upon said shaft for rotational movement relative thereto, washer-like spacing means upon said shaft between said inner face plate and said supporting base member and in engagement with both, an outer face plate positioned upon said shaft outwardly of said inner face plate and having a central opening therein of such size and configuration as to closely encircle said shaft and the flat surface on said shaft in such manner as to prevent relative rotational movement therebetween, said inner and outer face plates having a pair of accurately lapped flat surfaces formed respectively thereon and disposed in facing relation to each other, said inner face plate being provided with a plurality of spaced discontinuous slots formed in its lapped surface, said outer face plate being provided with a plurality of fluid entry and exit ports circularly arranged about said central opening therein and extending through said outer face plate so as to pierce the lapped surface thereon, spring means surrounding the free outer end of said shaft, releasable screw means threaded into the outer end of said shaft and compressively engaging said spring means so as to urge same into engagement with said outer face plate, and thereby urge the lapped surface of said outer face plate into firm engagement with the lapped surface on said inner face plate, each of said discontinuous slots communicating with at least one of the ports in said outer face plate in one selected operative portion of said inner face plate, said discontinuous slots being of such predetermined lengths and so located in said inner face plate as to communicate with a plurality of said ports when said inner face plate is rotated relative to said outer face plate to a different operative position, a continuous slot formed in the lapped surface of one of said face plates closely adjacent the outer edge thereof, a second continuous slot formed in the lapped surface of one of said face plates closely adjacent the central opening therein, diametrically opposed entry and exit ports extending through said outer face plate and communicating with each of said continuous slots, whereby a continuous flow of fluid may be maintained through both of said continuous slots when desired regardless of the position of said face plates relative to each other, and actuating means surrounding said shaft and said washer-like spacing means and having means engaging with said inner face plate for rotating same, and an actuating arm extending outwardly from said actuating means for effecting arcuate movement of said inner face plate relative to said outer face plate and moving said discontinuous slots into different communicating combinations with said ports.

2. The combination as defined in claim 1 and wherein said washer-like spacing means is so shaped as to serve as a gimbal-type support between said inner face plate and said supporting base member.

References Cited

UNITED STATES PATENTS

| | | | |
|---|---|---|---|
| 1,473,282 | 11/1923 | Cosgrove | 251—180 X |
| 2,013,403 | 9/1935 | Cameron | 251—180 X |
| 2,349,822 | 5/1944 | Gardner | 251—180 X |
| 2,875,785 | 3/1959 | Foltzer | 137—629 |
| 2,918,938 | 12/1959 | Kimball | 137—246.22 X |
| 2,965,116 | 12/1960 | Boone | 251—86 X |
| 3,040,777 | 6/1962 | Carson | 251—180 X |
| 3,292,652 | 12/1966 | Gallone | 137—246 |

CLARENCE R. GORDON, *Primary Examiner.*

U.S. Cl. X.R.

137—246.22; 251—180